United States Patent
Zhang

(10) Patent No.: US 9,288,194 B2
(45) Date of Patent: Mar. 15, 2016

(54) AUTHORIZATION METHOD, APPARATUS, AND SYSTEM

(71) Applicant: Tencent Technology (Shenzhen) Company Limited, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 75 days.

(21) Appl. No.: 14/089,642

(22) Filed: Nov. 25, 2013

(65) Prior Publication Data

US 2014/0082703 A1   Mar. 20, 2014

Related U.S. Application Data

(63) Continuation of application No. PCT/CN2013/076918, filed on Jun. 7, 2013.

(30) Foreign Application Priority Data

Aug. 9, 2012 (CN) .......................... 2012 1 0282560

(51) Int. Cl.
G06F 21/62 (2013.01)
G06F 21/31 (2013.01)
G06F 21/44 (2013.01)
H04L 29/06 (2006.01)

(52) U.S. Cl.
CPC ................ *H04L 63/08* (2013.01); *H04L 63/10* (2013.01); *H04L 63/168* (2013.01)

(58) Field of Classification Search
CPC ......... H04L 41/28; H04L 63/08; H04L 63/10; G06F 17/3028; G06F 21/31; G06F 21/44; G06F 21/62
USPC ............................................. 726/2–4, 21, 27
See application file for complete search history.

(56) References Cited

U.S. PATENT DOCUMENTS

| | | | |
|---|---|---|---|
| 2006/0208088 A1 | 9/2006 | Sekiguchi | |
| 2012/0253852 A1* | 10/2012 | Pourfallah et al. | 705/4 |
| 2013/0185354 A1* | 7/2013 | Seligstein et al. | 709/204 |
| 2013/0254858 A1* | 9/2013 | Giardina et al. | 726/7 |
| 2014/0013107 A1* | 1/2014 | Clair | 713/156 |
| 2014/0197232 A1* | 7/2014 | Birkler et al. | 235/375 |

FOREIGN PATENT DOCUMENTS

| | | |
|---|---|---|
| CN | 101350717 A | 1/2009 |
| CN | 102624687 A | 8/2012 |
| CN | 102821104 A | 12/2012 |

OTHER PUBLICATIONS

Tencent Technology, ISR WO, PCT/CN2013/076918, Sep. 12, 2013, 11 pgs.

* cited by examiner

*Primary Examiner* — Joseph P Hirl
*Assistant Examiner* — Kalish Bell
(74) *Attorney, Agent, or Firm* — Morgan, Lewis & Bockius LLP

(57) ABSTRACT

The present invention discloses an authorization method, apparatus, and system, and belongs to the field of communication technologies. The method includes: receiving information for accessing a third-party network application platform; generating a two-dimensional code corresponding to the third-party network application platform, and presenting the two-dimensional code in the third-party network application platform; and receiving information of the scanned two-dimensional code, and authorizing, according to the information of the scanned two-dimensional code, the third-party network application platform. After the information for accessing the third-party network application platform is received, authorization is performed on a third-party web site by generating a two-dimensional code corresponding to the third-party web site and according to information of the scanned two-dimensional code. The third-party web site can be authorized by only scanning the corresponding two-dimensional code, which is easy to operate and reduces operation time.

19 Claims, 9 Drawing Sheets

AUTHORIZATION METHOD, APPARATUS, AND SYSTEM

RELATED APPLICATIONS

This application is a continuation application of PCT Patent Application No. PCT/CN2013/076918, entitled "AUTHORIZATION METHOD, APPARATUS, AND SYSTEM" filed on Jun. 7, 2013, which claims priority to Chinese Patent Application No. 201210282560.1, entitled "AUTHORIZATION METHOD, APPARATUS, AND SYSTEM," filed on Aug. 9, 2012, both of which are incorporated by reference in their entirety.

TECHNICAL FIELD

The disclosed implementations relate generally to the field of communications technologies, and in particular, to authorization methods, apparatus, and systems.

BACKGROUND

One of the results of the ongoing development of communications technologies is that communication networks are being configured and/or updated with features that enable greater user engagement, connectivity and access to network-based (e.g., Internet-based) functionality, content and/or services. A user may access various network-based functionality, content and/or services through various network application platforms, such as a web site, a chatting tool, a mail tool, and an online game. For example, a user may access and receive content from various web sites to browse information, chat through various chatting tools, and so on.

Currently, in order to gain access to various controlled-access web sites (e.g. a social network, a news web site, etc.) a user needs to register, by creating an account identifier and a password (i.e., user credentials including a username and password), and subsequently log in the web site using the account identifier and password. As such, a user must create an account (complete with an account identifier and password) for each network application platform. For example, in order to use an online chatting tool (e.g., a short message application), a user needs to register a corresponding account identifier and password, and subsequently log in every time the user wants to use the online chatting tool. In another example, in order to use member-reserved services provided by an online retailer, a user needs to register a corresponding account identifier and password, and subsequently log in every time the user wants to access the member-reserved services. Creating distinct accounts for each network application platform, and subsequently providing account credentials each time a network application platform is at the very least redundant and cumbersome for a user to manage.

Previously developed systems and methods generally rely on linking the various accounts associated with one user by using user-agent redirections, such as Open Authorization (OAuth). Using OAuth for example, provides a process that enables a user to permit other network application platforms to access user data on a first network application platform. In particular, in order to authorize a second network application platform to access user data on a first network application platform, the user first logs into the first network application platform and authorizes access to the user data by the second network application platform using an application program interface (API) provided by the first network application program. More specifically, the API for authorizing access to user data on a first network application platform by a second network application platform includes the following. A server of the first network application platform obtains information for the user to open the second network application platform. The server of the first network application platform prompts the user whether to authorize, through the registered first network application platform, the second network application platform. The server then prompts the user to input the account and password that are registered in the first network application platform if the user determines to authorize, through the first network application platform, the second network application platform. After the account and password, which are registered in the first network application platform, input by the user are correct, the second network application platform is authorized, and can use relevant information when the user registers in the first network application platform.

Alternatively, programs, such as Java cookies, are used to keep sockets open between the user device and the various network application platforms that the user is currently logged into. As a result, the cookies enable a user to post content from one network application platform to another by selecting an icon. For example, various news web sites allow users to post links to new stories on various social networks by providing selectable icons on the web pages including the news story. The link is posted when the user selects the icon associated with a particular social network.

However, the previously developed systems and methods have at least the following problem. When the second network application platform is authorized to use the relevant information when the user registers in the first network application platform, the account and password that are registered in the first network application platform need to be input, which is redundant and cumbersome. Additionally, in the process of inputting the account and password, the account and password could be obtained by a malicious user through phishing software.

SUMMARY

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various implementations enable a first network application platform to provide a second network application platform access to user data on the first network application platform.

In order to solve the problem in the prior art, embodiments of the present invention provide an authorization method, apparatus, and system. The technical solutions are described as follows.

An authorization method is provided, where the method includes:

receiving information for accessing a third-party network application platform;

generating a two-dimensional code corresponding to the third-party network application platform, and presenting the two-dimensional code in the third-party network application platform; and receiving information of the scanned two-dimensional code, and authorizing, according to the information of the scanned two-dimensional code, the third-party network application platform.

An authorization apparatus is provided, where the apparatus includes:

a receiving module, configured to receive information for accessing a third-party network application platform;

a processing module, configured to: after the receiving module receives the information for accessing the third-party network application platform, generate a two-dimensional code corresponding to the third-party network application platform, and present the two-dimensional code in the third-party network application platform; and an authorization module, configured to: after the processing module presents the two-dimensional code in the third-party network application platform, receive information of the scanned two-dimensional code, and authorize, according to the information of the scanned two-dimensional code, the third-party network application platform.

An authorization system is provided, where the system includes: a first network application platform, where the first network application platform includes:

a receiving module, configured to receive information for accessing a third-party network application platform;

a processing module, configured to: after the receiving module receives the information for accessing the third-party network application platform, generate a two-dimensional code corresponding to the third-party network application platform, and present the two-dimensional code in the third-party network application platform; and an authorization module, configured to: after the processing module presents the two-dimensional code in the third-party network application platform, receive information of the scanned two-dimensional code, and authorize, according to the information of the scanned two-dimensional code, the third-party network application platform.

Beneficial effects of the technical solutions provided by the embodiments of the present invention are described as follows.

After the information for accessing the third-party network application platform is received, authorization is performed on a third-party web site by generating a two-dimensional code corresponding to the third-party web site and according to information of the scanned two-dimensional code. The third-party web site can be authorized by only scanning the corresponding two-dimensional code, which is easy to operate and reduces operation time. A user does not need to input an account and a password, which improves the security.

Another aspect of the disclosure is a computer-implemented method of a first network application platform providing a second network application platform access to user data hosted on the first network application platform. In some implementations, the method comprises: at a first network application platform comprising at least one processor and non-transitory memory: receiving a request to allow access to user data hosted on the first network application platform; generating a two-dimensional code to enable access to the user data through the second network application platform; transmitting the two-dimensional code to the second network application platform; receiving information associated with the two-dimensional code; and authoring access to the user data through the second network application platform based at least on the received information associated with the two-dimensional code.

In some implementations, the request is included in a message addressed from a first client device, wherein the client device has access to the second network application platform. In some implementations, the two-dimensional code is transmitted with instructions directing the second network application platform to provide the two-dimensional code to the first client device. In some implementations, providing the two-dimensional code to the first client device includes providing an instruction directing the first client device to visually display the two-dimensional code. In some implementations, providing the two-dimensional code to the first client device includes presenting the two-dimensional code on a security enhanced web-page that is displayable by the first client device.

In some implementations, the two-dimensional code is transmitted with instructions directing the second network application platform to provide the two-dimensional code to one of the first client device and a second client device. In some implementations, the received information associated with the two-dimensional code includes at least one of a scanned image of the two-dimensional code and information decoded from the two-dimensional code by a receiving device.

In some implementations, authorizing access to the user data through the second network application platform includes comparing the received information associated with the two-dimensional code to locally stored information associated with the two-dimensional code. In some implementations, generating the two-dimensional code includes encoding at least a portion of the locally stored information associated with the two-dimensional code.

In some implementations, generating the two-dimensional code comprises generating a universal unique identifier (UUID) corresponding to the second network application platform. In some implementations, transmitting the two-dimensional code to the second network application platform comprises sending the UUID to the second network application platform along with instructions directing the second network application platform to provide the UUID to one or more client devices. In some implementations, the instructions directing the second network application platform also includes instruction for the second network application platform to provide a authorization request web-page. In some implementations, receiving information associated with the two-dimensional code includes receiving information associated with the UUID. In some implementations, the information associated with the UUID includes at least one of a scanned copy of the UUID and information decoded from the UUID.

In some implementations, receiving information associated with the two-dimensional code includes: receiving the information of the two-dimensional code scanned by a client device; obtaining an identifier of the client device scanning the two-dimensional code; searching for user information based at least on the identifier; establishing and storing a corresponding relationship between the second network application platform and the user information; sending authorization determination information to the client device directing the client device to determine whether to perform authorization; receiving an authorization confirmation instruction from the client device; and sending authorization confirmation information to the second network application platform.

In some implementations, receiving a non-authorization confirmation instruction from the client device, and sending non-authorization confirmation information to the second network application platform.

Another aspect of the disclosure is a first network application platform server system comprising: a processor; a network interface; and a non-transitory memory including instructions, that when executed by the processor cause the server system to: receive, using the network interface, a request to allow access to user data hosted on a first network application platform database; generating a two-dimensional code to enable access to the user data through a second network application platform; transmit, using the network interface, the two-dimensional code to the second network application platform; receive, using the network interface, information associated with the two-dimensional code; and authorize access to the user data through the second network application platform based at least on the received information associated with the two-dimensional code.

Another aspect of the disclosure is a method of accessing user data hosted on the first network application platform through a second network application platform. In some implementations, the method comprises: at a first client device comprising at least one processor and non-transitory memory: scanning a two-dimensional code, wherein the two-dimensional code originates from the first network application platform to enable access to the user data hosted on the first network application platform through the second network application platform; and transmitting at least a portion of information associated with the two-dimensional code to the first network application platform.

In some implementations, the method further comprises receiving an access indicator in response to transmitting at least the portion of the information associated with the two-dimensional code to the first network application platform, wherein the access indicator is representative of whether or not access has been granted to the user data hosted on the first network application platform through the second network application platform.

In some implementations, the method further comprises directing access to the user data hosted on the first network application platform through the second network application platform application running on a second client device.

In some implementations, the method further comprises accessing a user account on the first network application platform by providing user credentials associated with the user account. In some implementations, the method further comprises receiving the two-dimensional code through the user account on the second network application platform.

In some implementations, the two-dimensional code is scanned from a display of a second client device using an imaging device associated with the first client device. In some implementations, the two-dimensional code is scanned from a display associated with the first client device. In some implementations, the information associated with the two-dimensional code includes at least one of a scanned image of the two-dimensional code and information decoded from the two-dimensional code by the first client device.

In some implementations, the method further comprises decoding at least a portion of the two-dimensional code.

Another aspect of the disclosure is a client device comprising: a processor; an imaging module; a network interface; and a non-transitory memory including instructions, that when executed by the processor cause the client device to: scan a two-dimensional code using the imaging module, wherein the two-dimensional code originates from the first network application platform to enable access to the user data hosted on the first network application platform through the second network application platform; and transmit, using the network interface, at least a portion of information associated with the two-dimensional code to the first network application platform.

In some implementations, the instructions further comprise receiving an access indicator in response to transmitting at least the portion of the information associated with the two-dimensional code to the first network application platform, wherein the access indicator is representative of whether or not access has been granted to the user data hosted on the first network application platform through the second network application platform. In some implementations, the instructions further comprise directing access to the user data hosted on the first network application platform through the second network application platform application running on a second client device.

In some implementations, the instructions further comprise accessing a user account on the first network application platform by providing user credentials associated with the user account. In some implementations, the instructions further comprise receiving the two-dimensional code through the user account on the second network application platform. In some implementations, the instructions further comprise decoding at least a portion of the two-dimensional code.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

In order to make the objectives, technical solutions, and advantages of the present invention more clear, the following further describes the embodiments of the present invention in detail with reference to the accompanying drawings.

Embodiment 1

Figure 1:
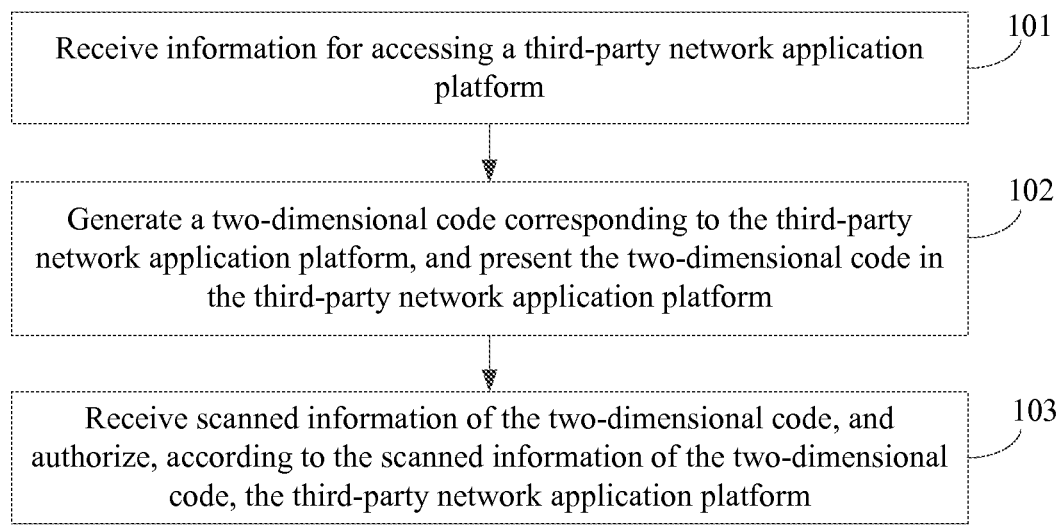
FIG. 1 is a flowchart of an authorization method in accordance with some implementations.

Referring to FIG. 1, an embodiment of the present invention provides an authorization method, which includes:

101: Receive information for accessing a third-party network application platform.

102: Generate a two-dimensional code corresponding to the third-party network application platform, and present the two-dimensional code in the third-party network application platform.

103: Receive information of the scanned two-dimensional code, and authorize, according to the information of the scanned two-dimensional code, the third-party network application platform.

Furthermore, the step of generating the two-dimensional code corresponding to the third-party network application platform, and presenting the two-dimensional code in the third-party network application platform includes:

generating a universal unique identifier (UUID) corresponding to the third-party network application platform, and sending the UUID to the third-party network application platform, so that after receiving the UUID, the third-party network application platform sends network-end authorization page request information to a local end;

receiving the network-end authorization page request information sent by the third-party network application platform, and sending a network-end authorization page to the third-party network application platform, so that after receiving the network-end authorization page, the third-party network application platform presents the network-end authorization page, and sends two-dimensional code request information carrying the UUID to the local end; and receiving the two-dimensional code request information carrying the UUID, generating, according to the UUID, the two-dimensional code corresponding to the third-party network application platform, and sending the two-dimensional code to the third-party network application platform, so that after receiving the two-dimensional code, the third-party network application platform presents the two-dimensional code in the network-end authorization page.

Furthermore, the step of receiving the information of the scanned two-dimensional code, and authorizing the third-party network application platform according to the information of the scanned two-dimensional code includes:

receiving the information of the two-dimensional code scanned by a client;

obtaining an identifier (ID) of the client scanning the two-dimensional code;

according to the ID of the client, searching for user information (UIN) of the client, and establishing and storing a corresponding relationship between the UUID and the UIN;

sending authorization determination information to the client, so that after receiving the authorization determination information, the client determines whether to perform authorization; and receiving an authorization confirmation instruction that is sent by the client, and sending authorization confirmation information to the third-party network application platform.

Furthermore, after the step of sending the authorization determination information to the client, so that after receiving the authorization determination information, the client determines whether to perform authorization, the method further includes:

receiving a non-authorization confirmation instruction that is sent by the client, and sending non-authorization confirmation information to the third-party network application platform.

In the authorization method provided by the embodiment of the present invention, after the information for accessing the third-party network application platform is received, authorization is performed on a third-party web site by generating a two-dimensional code corresponding to the third-party web site and according to information of the scanned two-dimensional code. The third-party web site can be authorized by only scanning the corresponding two-dimensional code, which is easy to operate and reduces operation time. A user does not need to input an account and a password, which improves the security.

The authorization method provided by the embodiment of the present invention can be applied in that another network application platform is authorized, through an account and a password that are registered by a user in any network application platform, to use relevant information of the user, and for the convenience of illustration, an example that authorization is performed on a third-party web site through a WeChat application platform is taken for further illustration.

Embodiment 2

Figure 2:
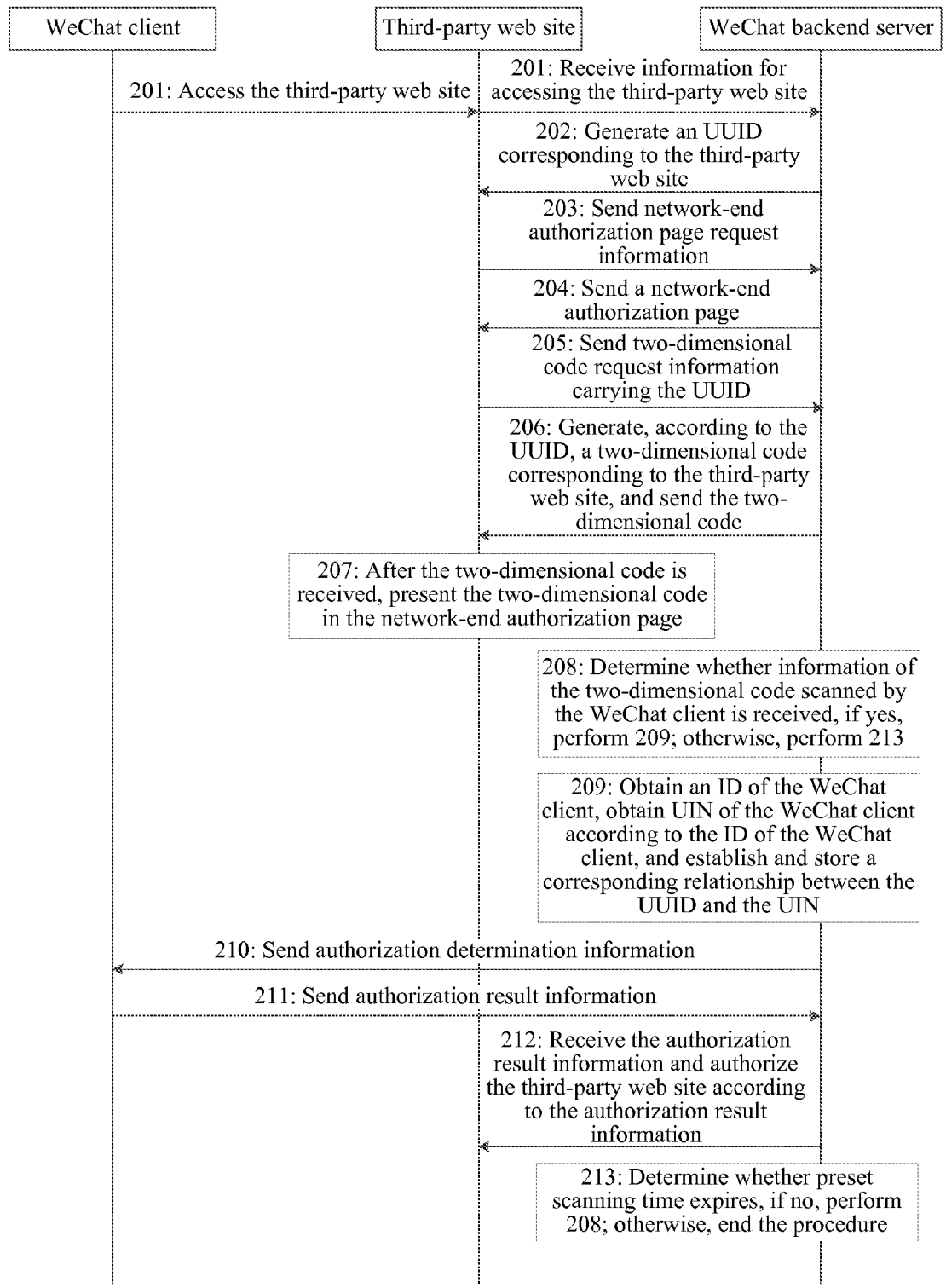
FIG. 2 is a flowchart of an authorization method in accordance with some implementations.

Referring to FIG. 2, an embodiment of the present invention provides an authorization method, which includes:

201: When a WeChat client accesses a third-party web site through a browser, a WeChat backend server receives information for accessing the third-party web site.

The third-party web site may be any web site establishing a cooperative relationship with the WeChat, which is not limited herein.

202: The WeChat backend server generates a universal unique identifier (UUID) corresponding to the third-party web site, and sends the UUID to the third-party web site.

Specifically, the UUID corresponding to the third-party web site may be generated by adopting any existing available method, which is not specifically limited.

203: After receiving the UUID, the third-party web site sends network-end authorization page request information to the WeChat backend server.

A network end authorization page is a page used to display a two-dimensional code, and the two-dimensional code may be displayed on the page for a user to scan.

204: After receiving the network-end authorization page request information, the WeChat backend server sends a network-end authorization page to the third-party web site.

Specifically, the WeChat backend server may preset a corresponding network-end authorization page for the third-party web site and store the network-end authorization page, and when receiving the network-end authorization page request information, the WeChat backend server queries the network-end authorization page corresponding to the third-party web site, and sends the found network-end authorization page to the third-party web site.

When the WeChat establishes a cooperative relationship with multiple third-party web sites, a uniform network-end authorization page may be set for the multiple third-party web sites, or a network-end authorization page may also be set for each third-party web site, which may be set according to an actual application condition and is not limited herein.

205: After receiving the network-end authorization page, the third-party web site presents the network-end authorization page, and sends two-dimensional code request information carrying the UUID to the WeChat backend server.

206: The WeChat backend server receives the two-dimensional code request information carrying the UUID, generates, according to the UUID, a two-dimensional code corresponding to the third-party web site, and sends the two-dimensional code to the third-party web site.

The two-dimensional code is also called a two-dimensional bar code, which is a bar code having readability and extended based on a one-dimensional bar code. A device having a scanning function scans a two-dimensional code, and obtains information included in the two-dimensional code by identifying binary data recorded in the length and width of the two-dimensional code. Compared with a one-dimensional code, more complex data is recorded in the two-dimensional code, such as an image and a network link. Information in the two-dimensional code in the embodiment of the present invention includes information such as request time of the third-party web site and a source of the third-party web site.

207: After receiving the two-dimensional code, the third-party web site presents the two-dimensional code in the network-end authorization page.

Specifically, after the two-dimensional code is presented in the network-end authorization page, a user may scan the two-dimensional code, and authorize the third-party web site through the two-dimensional code.

208: The WeChat backend server determines whether information of the two-dimensional code scanned by the WeChat client is received, if yes, perform 209; otherwise, perform 213.

Specifically, if the WeChat client having a scanning function decides to authorize the third-party web site in a manner of scanning the two-dimensional code, the scanning function of the WeChat client may be opened to scan the two-dimensional code.

209: The WeChat backend server receives an identifier (ID) of the WeChat client scanning the two-dimensional code, searches, according to the ID of the WeChat client, for user information (UIN) of the WeChat client in a client information database, and when finding the UIN of the WeChat client, establishes and stores a corresponding relationship between the UUID and the UIN.

The ID of the WeChat client may be a WeChat number of the WeChat client, and so on.

The client information database may be set in the WeChat backend server or another place, which is not limited.

The UIN includes information provided when a user registers the WeChat, such as a user name and a WeChat number.

210: The WeChat backend server sends authorization determination information to the WeChat client.

The authorization determination information is information for prompting a user whether to authorize the third-party web site, the content may be "whether to authorize the third-party web site, if confirm to authorize, please press "Yes"; otherwise press "No"" and so on, which may be set according to an actual application condition and is not limited herein.

211: The WeChat client receives the authorization determination information, determines to authorize or not authorize the third-party web site, and sends authorization result information to the WeChat backend server.

212: The WeChat backend server receives the authorization result information and authorizes the third-party web site according to the authorization result information, and the procedure ends.

Specifically, if the authorization result information is an authorization confirmation instruction of the WeChat client authorizing the third-party web site, the WeChat backend server generates a token for the third-party web site, and sends the token to the third-party web site, so as to complete authorizing the third-party web site. If the authorization result information is that the WeChat client does not authorize the third-party web site, the WeChat backend server returns the information to the third-party web site.

213: The WeChat backend server determines whether preset scanning time expires, if no, perform 208; otherwise, end.

The preset scanning time may be one minute, 10 minutes, and so on, and may be set according to an actual application condition and is not limited herein.

In the authorization method provided by the embodiment of the present invention, after the information for accessing the third-party network application platform is received, authorization is performed on a third-party web site by generating a two-dimensional code corresponding to the third-party web site and according to information of the scanned two-dimensional code. The third-party web site can be authorized by only scanning the corresponding two-dimensional code, which is easy to operate and reduces operation time. A user does not need to input an account and a password, which improves the security.

Embodiment 3

Figure 3:
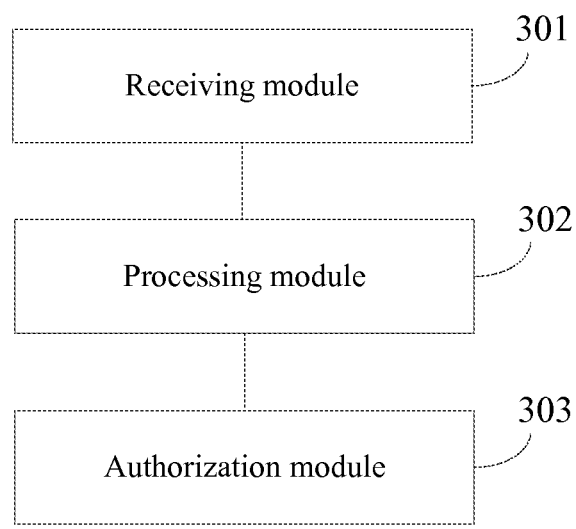
FIG. 3 is a schematic diagram of an authorization apparatus in accordance with some implementations.

Referring to FIG. 3, an embodiment of the present invention provides an authorization apparatus, where the apparatus includes:

a receiving module 301, configured to receive information for accessing a third-party network application platform;

a processing module 302, configured to: after the receiving module 301 receives the information for accessing the third-party network application platform, generate a two-dimensional code corresponding to the third-party network application platform, and present the two-dimensional code in the third-party network application platform; and an authorization module 303, configured to: after the processing module 302 presents the two-dimensional code in the third-party network application platform, receive information of the scanned two-dimensional code, and authorize, according to the information of the scanned two-dimensional code, the third-party network application platform.

Furthermore, the processing module 302 includes:

a generation unit, configured to: after the receiving module 301 receives the information for accessing the third-party network application platform, generate a universal unique identifier (UUID) corresponding to the third-party network application platform, and send the UUID to the third-party network application platform, so that after receiving the UUID, the third-party network application platform sends network-end authorization page request information to a local end;

a presentation unit, configured to receive the network-end authorization page request information sent by the third-party network application platform, and send a network-end authorization page to the third-party network application platform, so that after receiving the network-end authorization page, the third-party network application platform presents the network-end authorization page, and sends two-dimensional code request information carrying the UUID to the local end; and a processing unit, configured to receive the two-dimensional code request information carrying the UUID, generate, according to the UUID, the two-dimensional code corresponding to the third-party network application platform, and send the two-dimensional code to the third-party network application platform, so that after receiving the two-dimensional code, the third-party network application platform presents the two-dimensional code in the network-end authorization page.

Furthermore, the authorization module 303 includes:

a receiving unit, configured to receive the information of the two-dimensional code scanned by a client;

an obtaining unit, configured to obtain an identifier (ID) of the client scanning the two-dimensional code;

a search unit, configured to: according to the ID of the client, search for user information (UIN) of the client, and establish and store a corresponding relationship between the UUID and the UIN;

a determination unit, configured to send authorization determination information to the client, so that after receiving the authorization determination information, the client determines whether to perform authorization; and a first authorization unit, configured to receive an authorization confirmation instruction that is sent by the client, and send authorization confirmation information to the third-party network application platform.

Furthermore, the authorization module 303 further includes:

a second authorization unit, configured to receive a non-authorization confirmation instruction that is sent by the client, and send non-authorization confirmation information to the third-party network application platform.

Through the authorization apparatus provided by the embodiment of the present invention, after the information for accessing the third-party network application platform is received, authorization is performed on a third-party web site by generating a two-dimensional code corresponding to the third-party web site and according to information of the scanned two-dimensional code. The third-party web site can be authorized by only scanning the corresponding two-dimensional code, which is easy to operate and reduces operation time. A user does not need to input an account and a password, which improves the security.

Embodiment 4

Figure 4:
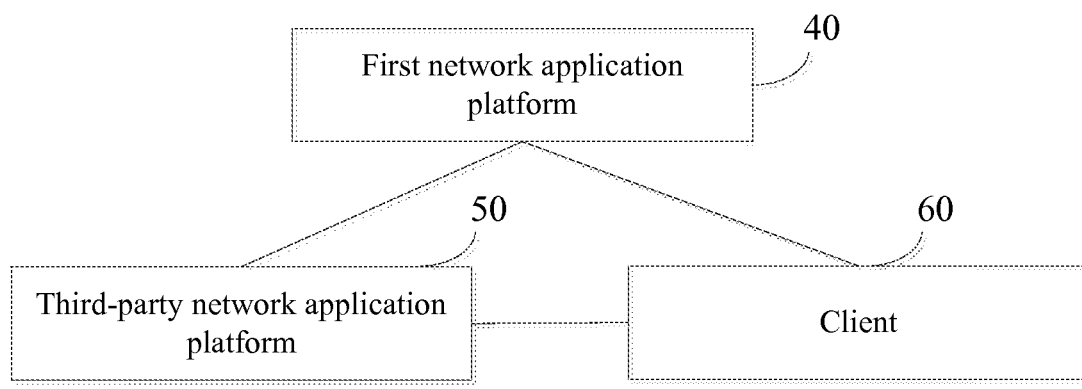
FIG. 4 is a schematic diagram of an authorization system in accordance with some implementations.

Referring to FIG. 4, an embodiment of the present invention provides an authorization system, where the system includes: a first network application platform 40, where the first network application platform 40 includes:

a receiving module, configured to receive information for accessing a third-party network application platform;

a processing module, configured to: after the receiving module receives the information for accessing the third-party network application platform, generate a two-dimensional code corresponding to the third-party network application platform, and present the two-dimensional code in the third-party network application platform; and an authorization module, configured to: after the processing module presents the two-dimensional code in the third-party network application platform, receive information of the scanned two-dimensional code, and authorize, according to the information of the scanned two-dimensional code, the third-party network application platform.

Furthermore, the processing module includes:

a generation unit, configured to: after the receiving module receives the information for accessing the third-party network application platform, generate a universal unique identifier (UUID) corresponding to the third-party network application platform, and send the UUID to the third-party network application platform.

Correspondingly, referring to FIG. 4, the system further includes a third-party network application platform 50, where the third-party network application platform 50 includes:

a UUID receiving unit, configured to receive the UUID, and after receiving the UUID, send network-end authorization page request information to the first network application platform 40.

Correspondingly, the processing module further includes:

a presentation unit, configured to receive the network-end authorization page request information sent by the UUID receiving unit, and send a network-end authorization page to the third-party network application platform 50.

Correspondingly, the third-party network application platform 50 further includes:

a network-end authorization page presentation unit, configured to receive the network-end authorization page sent by the presentation unit, and after receiving the network-end authorization page, present the network-end authorization page, and send two-dimensional code request information carrying the UUID to the first network application platform 40.

Correspondingly, the processing module further includes:

a processing unit, configured to receive the two-dimensional code request information carrying the UUID that is sent by the network-end authorization page presentation unit, generate, according to the UUID, a two-dimensional code corresponding to the third-party network application platform 50, and send the two-dimensional code to the third-party network application platform 50.

Correspondingly, the third-party network application platform 50 further includes:

a two-dimensional code presentation unit, configured to receive the two-dimensional code sent by the processing unit, and after receiving the two-dimensional code, present the two-dimensional code in the network-end authorization page.

Furthermore, referring to FIG. 4, the system further includes: a client 60, where the client 60 includes: a two-dimensional code scanning unit, configured to scan the two-dimensional code.

Correspondingly, the authorization module includes:

a receiving unit, configured to receive information of a two-dimensional code scanned by the client 60;

an obtaining unit, configured to obtain an identifier (ID) of the client 60 scanning the two-dimensional code;

a search unit, configured to: according to the ID of the client 60, search for user information (UIN) of the client 60, and establish and store a corresponding relationship between the UUID and the UIN; and a determination unit, configured to send authorization determination information to the client 60.

Correspondingly, the client 60 further includes:

a first authorization confirmation unit, configured to receive the authorization determination information sent by the determination unit, and after receiving the authorization determination information, send an authorization confirmation instruction to the first network application platform 40.

Correspondingly, the authorization module further includes:

a first authorization unit, configured to receive the authorization confirmation instruction that is sent by the first authorization confirmation unit, and send authorization confirmation information to the third-party network application platform 50.

Furthermore, the client 60 further includes:

a second authorization confirmation unit, configured to receive the authorization determination information sent by the determination unit, and after receiving the authorization determination information, send a non-authorization confirmation instruction to the first network application platform 40.

Correspondingly, the authorization module further includes:

a second authorization unit, configured to receive the non-authorization confirmation instruction that is sent by the second authorization confirmation unit, and send non-authorization confirmation information to the third-party network application platform 50.

Through the authorization system provided by the embodiment of the present invention, after the information for accessing the third-party network application platform 50 is received, authorization is performed on a third-party web site by generating a two-dimensional code corresponding to the third-party web site and according to information of the scanned two-dimensional code. The third-party web site can be authorized by only scanning the corresponding two-dimensional code, which is easy to operate and reduces operation time. A user does not need to input an account and a password, which improves the security.

Figure 5:
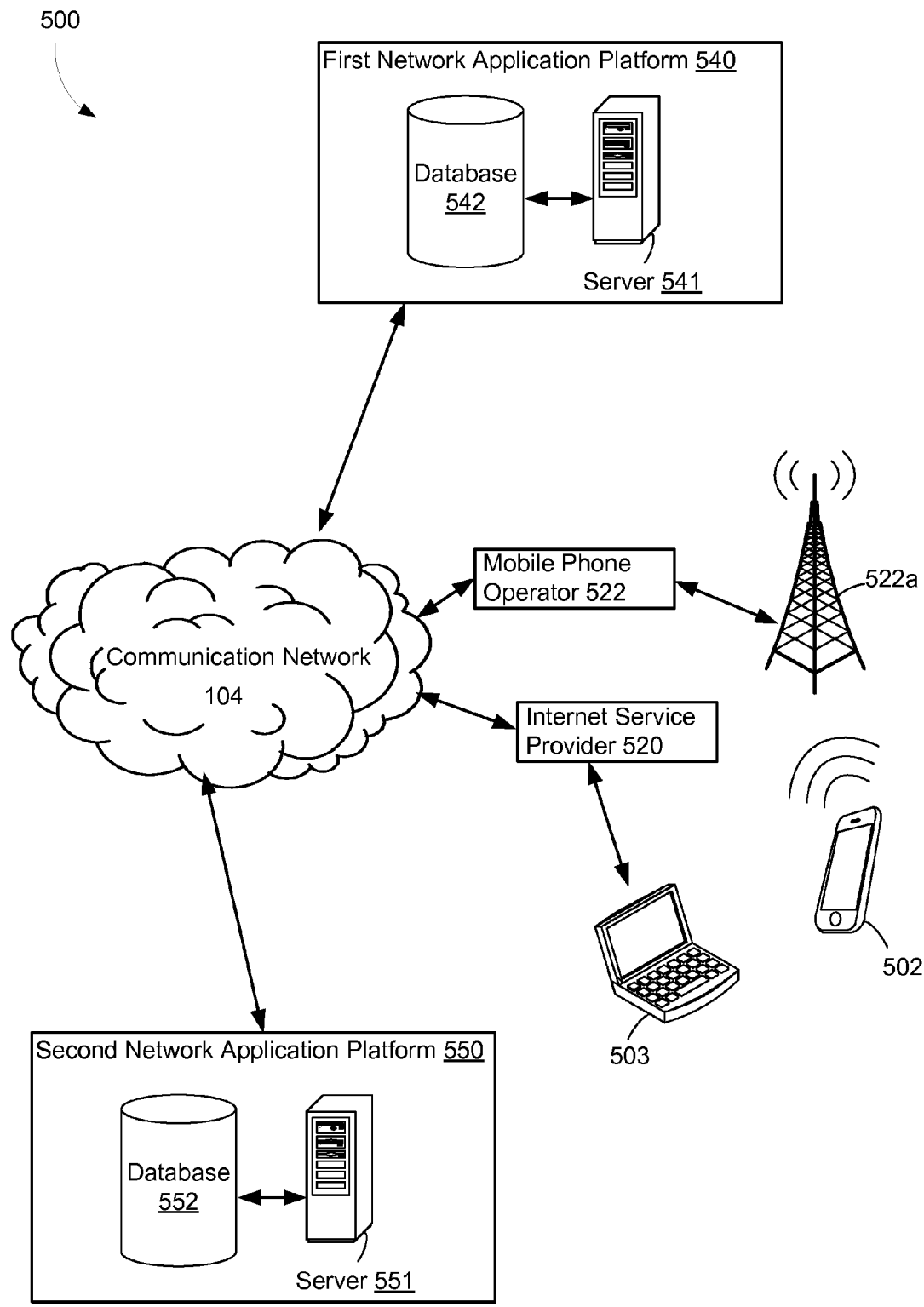
FIG. 5 is a diagram of a client-server environment in accordance with some implementations.

FIG. 5 is a diagram of a client-server environment 500 in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 500 includes a first network application platform 540, a second network application platform 550, a mobile phone operator 522 (i.e. wireless carrier), an internet service provider 520, and a communications network 104. Each of the first network application platform 540, the second network application platform 550, the mobile phone operator 522 (i.e. wireless carrier), and the internet service provider 520 are capable of being connected to the communication network 104 in order to exchange information with one another and/or other devices and systems. Additionally, the mobile phone operator 522 and the internet service provider 520 are operable to connect client devices to the communication network 104 as well. For example, a smartphone 502 is operable with the network of the mobile phone operator 522, which includes for example, a base station 522a. Similarly, for example, a laptop computer 503 (or tablet, desktop, workstation or the like) is connectable to the network provided by the internet service provider 520, which is ultimately connectable to the communication network 104. Moreover, while FIG. 5 only includes one of each of the aforementioned devices and systems, those skilled in the art will appreciate from the present disclosure that any number of such devices and/or systems may be provided in a client-server environment, and particular devices may be altogether absent. In other words, the client-server environment 500 is merely an example provided to discuss more pertinent features of the present disclosure.

The communication network 104 may be any combination of wired and wireless local area network (LAN) and/or wide area network (WAN), such as an intranet, an extranet, including a portion of the internet. It is sufficient that the communication network 104 provides communication capability between client devices and servers. In some implementations, the communication network 104 uses the HyperText Transport Protocol (HTTP) to transport information using the Transmission Control Protocol/Internet Protocol (TCP/IP). HTTP permits a client device to access various resources available via the communication network 104. However, the various implementations described herein are not limited to the use of any particular protocol.

In some implementations, the first network application platform 540 includes a server 541 and a database 542. In some implementations, the server 541 is implemented as a single server system, while in other implementations it is implemented as a distributed system of multiple servers. Solely for convenience of explanation, the server 541 is described below as being implemented on a single server system. The database 542 is used store user data for individual users and/or common data for groups of one or more users that have accounts with the first network application platform 540. The database 542 includes any number (i.e., one or more) of memory devices including, without limitation, non-volatile semiconductor memory devices, volatile semiconductor memory devices, and a single memory server system or a distributed system of multiple memory servers.

Similarly, in some implementations, the second network application platform 550 includes a server 551 and a database 552. In some implementations, the server 551 is implemented as a single server system, while in other implementations it is implemented as a distributed system of multiple servers. Solely for convenience of explanation, the server 551 is described below as being implemented on a single server system. The database 552 is used store user data for individual users and/or common data for groups of one or more users that have accounts with the second network application platform 550. The database 552 includes any number (i.e., one or more) of memory devices including, without limitation, non-volatile semiconductor memory devices, volatile semiconductor memory devices, and a single memory server system or a distributed system of multiple memory servers.

As discussed below in greater detail with reference to FIG. 6, client devices, such as the laptop 503 and smartphone 502, include a display and a digital camera. In some implementations, a mobile application is operated at least in part by the client device. In some implementations, the client devices 502 and 503 are enabled to communicate with the first and second network application platforms 540, 550. For example, the laptop 503 may include at least one of an Ethernet enabled network adapter or interface, a WiFi enabled network adapter or interface, cable modem, DSL modem, a cellular wireless device, or the like.

In operation, a user may use a client device 502/503 to access user data in the database 542 and/or a service managed by the server 541 of the first network application platform 540. Similarly, a user may use a client device 502/503 to access user data in the database 552 and/or a service managed by the server 551 of the first network application platform 550. For example, in order to make a purchase through the online customer sales application, the camera associated with the client device is used to obtain at least one image of the credit card and a picture of the user offering the credit card for payment purposes, which is processed according to one of the various methods described below.

Figure 6:
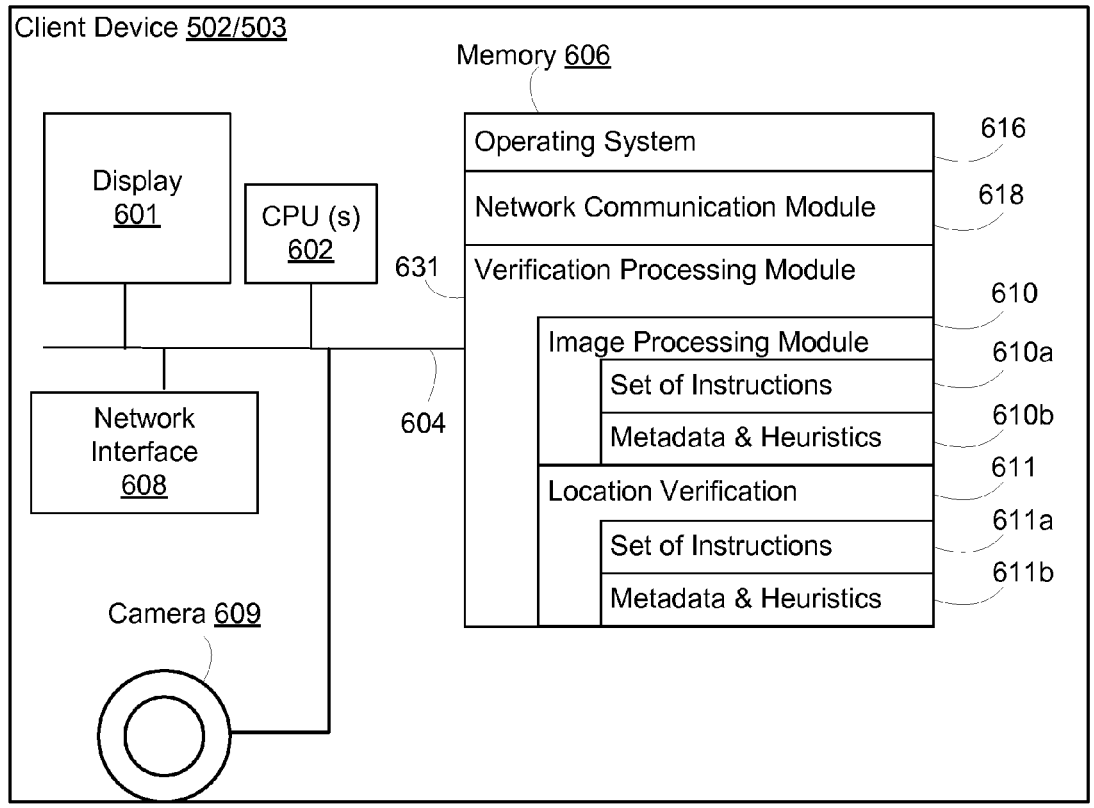
FIG. 6 is a diagram of an example implementation of a client device in accordance with some implementations.

FIG. 6 is a diagram of an example implementation of a client device 502/503 (e.g., laptop 503 and smartphone 502), discussed above with reference to FIG. 5, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client device 502/503 includes one or more processing units (CPU's) 602, one or more network or other communications interfaces 608, a display 601, memory 606, a digital camera 609, and one or more communication buses 604 for interconnecting these and various other components. The communication buses 604 may include circuitry (sometimes called a chipset) that interconnects and controls communications between system components. The memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 606 may optionally include one or more storage devices remotely located from the CPU(s) 602. The memory 606, including the non-volatile and volatile memory device(s) within the memory 606, comprises a non-transitory computer readable storage medium.

In some implementations, the memory 606 or the non-transitory computer readable storage medium of the memory 606 stores the following programs, modules and data structures, or a subset thereof including an operating system 616, a network communication module 618, and a verification processing module 631.

The operating system 616 includes procedures for handling various basic system services and for performing hardware dependent tasks.

The network communication module 618 facilitates communication with other devices via the one or more communication network interfaces 608 (wired or wireless) and one or more communication networks, such as the internet, other wide area networks, local area networks, metropolitan area networks, and so on.

The verification processing module 631 is configured to cooperate with instructions sent from at least one of the first network application platform 540 and the second network application platform 550. To that end, the verification processing module 631 includes an image processing module 610 and an optional voice and location data verification module 611. The image processing module 610 facilitates the capture and encoding of image data requested by the verification server. To that end, the image processing module 610 includes a set of instructions 610a and heuristics and metadata 610b. Similarly, the voice and location data verification module 611 facilitates the capture and encoding of voice and location data requested by the verification server. To that end, the voice and location data verification module 611 includes a set of instructions 611a and heuristics and metadata 611b.

Figure 7:
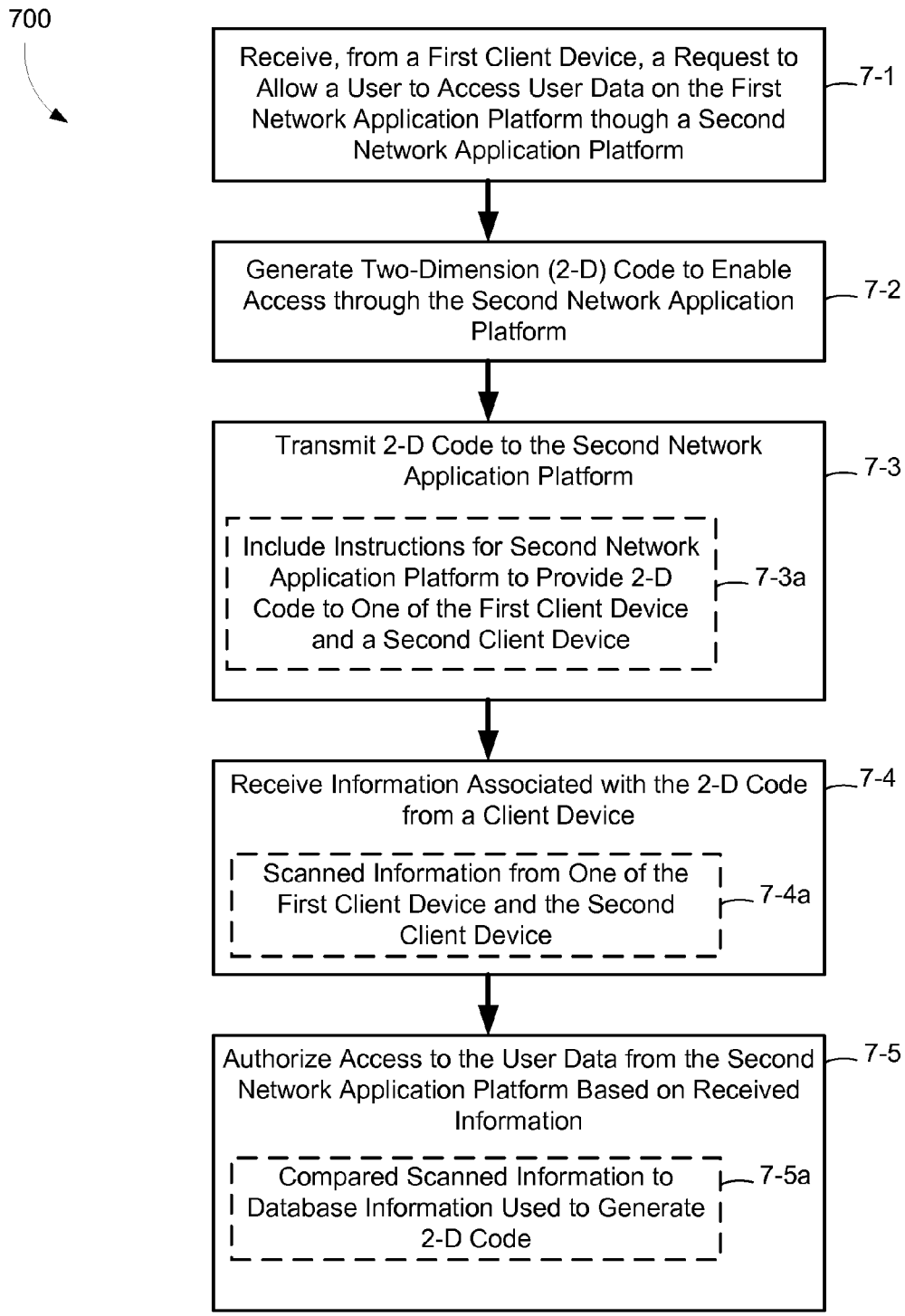
FIG. 7 is a flowchart representation of a first network application platform method of providing a second network application platform access to user data on the first network application platform.

FIG. 7 is a flowchart representation of a first network application platform method 700 of providing a second network application platform access to user data on the first network application platform. In some implementations, the method is performed by a device or system of a first network application platform in order to provide a second network application platform device or system access to user data managed by the first network application platform. For example, with reference to FIG. 5, in some implementations, the method 700 is performed by the server 541 of the first network application platform. Briefly, the method 700 includes generating and providing a two-dimensional (2-D) code that is used to link respective user accounts on the first and second network application platforms by way of at least one client device.

To that end, as represented by block 7-1, the method 700 includes receiving, from a first client device, a request to allow a user (i.e., client) to access user data on the first network application platform through a second network application platform. For example, with reference to FIG. 5, the first network application platform 540 receives a request from the laptop 503 or the smartphone 502. In some implementations, the request is communicated through the second network application platform 550 from the laptop 503 or smartphone 502 to the first network application platform 540.

As represented by block 7-2, the method 700 includes generating a two-dimensional (2-D) code to enable access through the second network application platform. For example, with continued reference to FIG. 5, the server 541 of the first network application platform 540 generates the 2-D code. In some implementations, the server 541 uses information stored in the database 542 to generate the 2-D code. As represented by block 7-3, the method 700 includes transmitting the 2-D code to the second network application platform. For example, with continued reference to FIG. 5, the server 541 of the first network application platform 540 transmits the 2-D code to the server 551 of the second network application platform 550 using the communication network 104. In some implementations, as represented by sub-block 7-3a, the method 700 includes providing instructions for the second network application platform to provide the 2-D code to one of the first client device and a second client device. In some implementations, the instructions direct the second network application platform to provide the 2-D code to a second client device that is different from the first client device that sent the request. For example, with reference to FIG. 5, the second network application platform 550 is directed to send the 2-D code to the smartphone 502 when the request was sent using the laptop 503, and vice versa. In some implementations, the instructions direct the second network application platform to provide the 2-D code to the first client device, which sent the request to the first network application platform. For example, with reference to FIG. 5, the second network application platform 550 is directed to send the 2-D code to the laptop 503 when the request originates from the laptop 503.

As represented by block 7-4, the method 700 includes receiving information associated with the 2-D code from a client device. As noted above, the 2-D code is presented to one of the first and second client devices. In some implementations, the 2-D code is presented using the other of the two client devices. That is, one of the client devices receives the 2-D code from the second network application platform and presents the 2-D code to the other client device, which draws information from the 2-D code. More specifically, as represented by block 7-4a, in some implementations the method 700 includes receiving a scanned version of the 2-D code from one of the first and second client devices. For example, with reference to FIG. 5, the 2-D code is presented on the display of the laptop 503 and scanned using the camera of the smartphone 502. In turn, the smartphone 502 sends a scanned copy of the 2-D code to the first network application platform 540.

As represented by block 7-5, the method 700 includes authorizing access to user data on the first network application platform from the second network application platform based on the received information associated with the 2-D code. For example, with reference to FIG. 5, the server 541 (of the first network application platform 540) authorizes the server 551 (of the second network application platform 550) to access user data stored in database 542. Additionally, in some implementations, as represented by block 7-5a, the method 700 includes comparing the received information to the information used to generate the 2-D code to determine whether or not the second network application platform should be granted access to the user data on the first network application platform.

Figure 8:
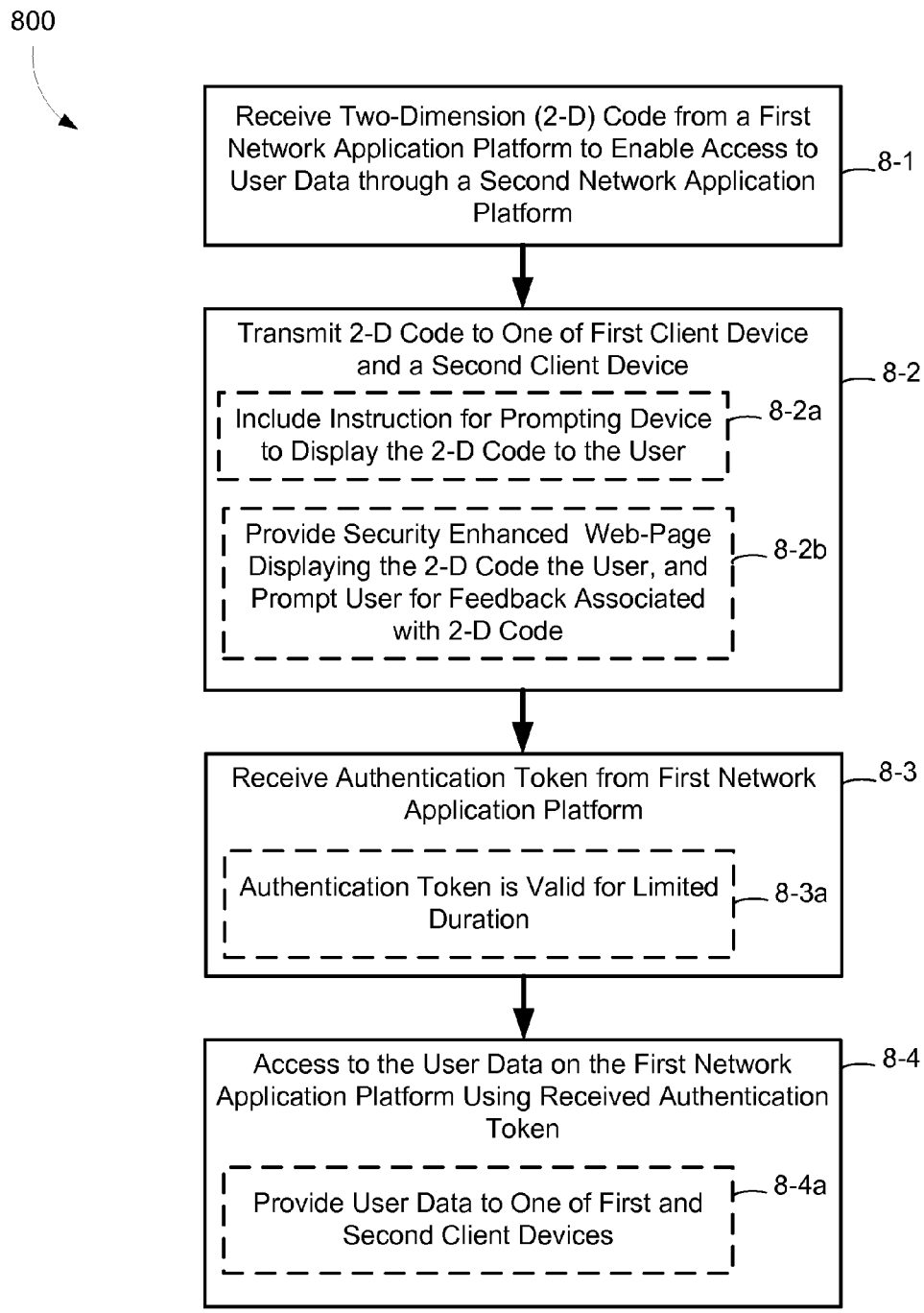
FIG. 8 is a flowchart representation of a method of obtaining access to user data on a first network application platform from a second network application platform.

FIG. 8 is a flowchart representation of a second network application platform method 800 of obtaining access to user data on a first network application platform from a second network application platform. In some implementations, the method is performed by a device or system of a second network application platform in order to provide the second network application platform device or system access to user data managed by a first network application platform. For example, with reference to FIG. 5, in some implementations, the method 800 is performed by the server 581 of the first network application platform. Briefly, the method 800 includes receiving and providing a two-dimension code that is used to link respective user accounts on the first and second network application platforms by way of at least one client device.

To that end, as represented by block 8-1, the method 800 includes receiving, from a first network application platform, a two-dimensional (2-D) code to enable access through the second network application platform. For example, with continued reference to FIG. 5, the server 551 of the second network application platform 550 receives the 2-D code from the server 541 of the first network application platform 540 through communication network 104. As represented by block 8-2, the method 800 includes transmitting the 2-D code to one of a first client device and a second client device. For example, with continued reference to FIG. 5, the server 551 of the second network application platform 550 transmits the 2-D code to one of the laptop 503 and the smartphone 502 using the communication network 104. In some implementations, as represented by sub-block 8-2a, the method 800 includes providing instructions for the receiving client device to present the 2-D code to the user. In some implementations, as represented by block 8-2b, the method 800 includes providing a security enhanced web-page displaying the 2-D code to the user and prompting the user to provide feedback associated with the 2-D code to the first network application platform. For example, with reference to FIG. 5, the laptop is directed to display the 2-D code in a web-browser from an enhanced security web-page. In turn, one of the laptop 503 and the smartphone 502 send feedback to the first network application platform 540.

As represented by block 8-3, the method 800 includes receiving an authentication token from the first network application platform. As represented by sub-block 8-3a, in some implementations, the authentication token is valid for a limited time. As represented by block 8-4, the method 800 includes accessing user data on the first network application platform from the second network application platform in response to receiving the authentication token. For example, with reference to FIG. 5, the server 551 (of the second network application platform 550) accesses user data stored in database 542 through the server 541 (of the first network application platform 540). Additionally, in some implementations, as represented by block 8-4a, the method 800 includes providing user data to one of the first and second client devices.

Figure 9:
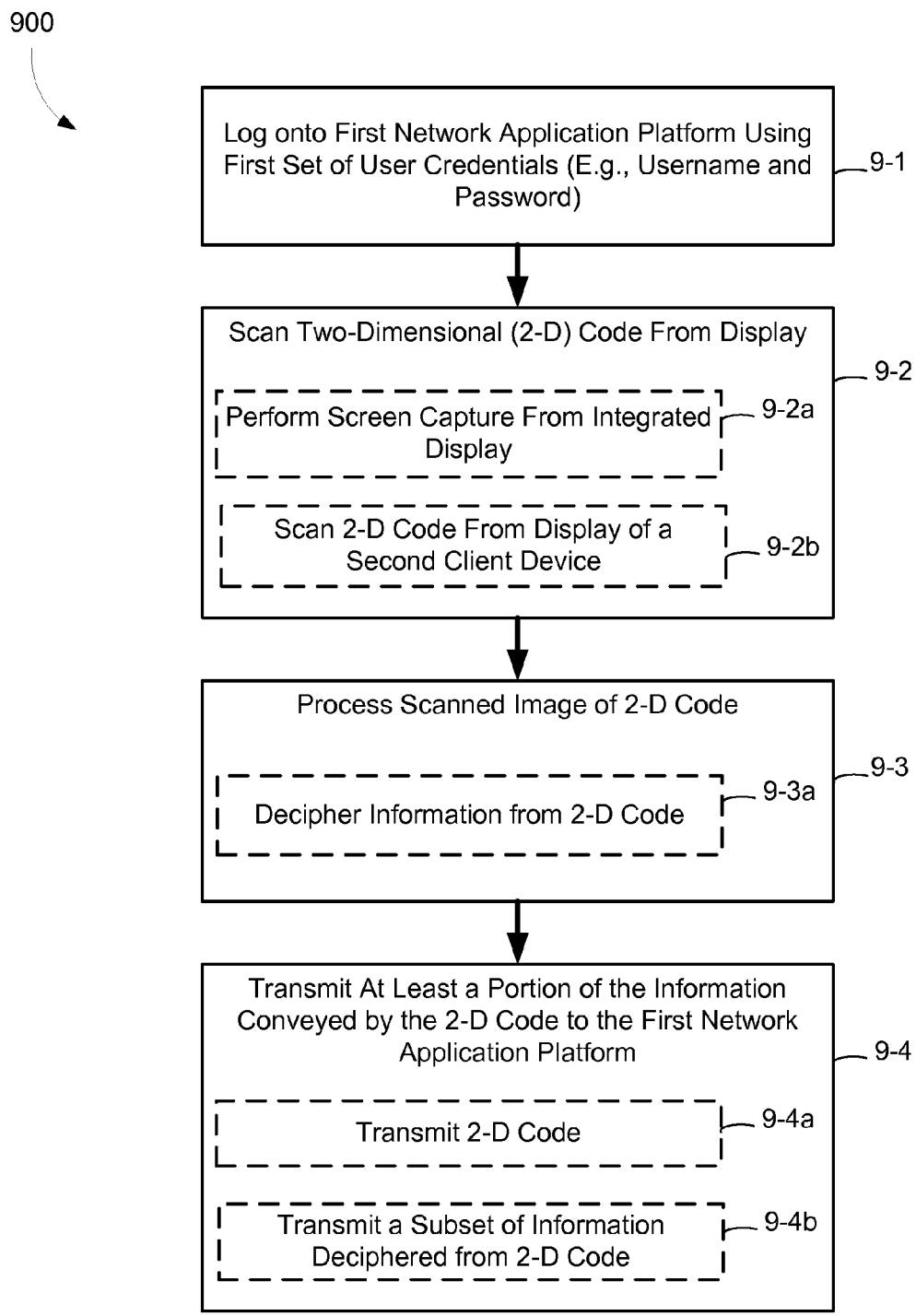
FIG. 9 is a flowchart representation of a method of accessing user data on a first network application platform through a second network application platform using a client device.

FIG. 9 is a flowchart representation of a method 900 of accessing user data on a first network application platform through a second network application platform using a client device. In some implementations, the method is performed by a client device in order to provide a second network application platform device or system access to user data managed by a first network application platform. For example, with reference to FIG. 5, in some implementations, the method 900 is performed by one of the laptop 503 and the smartphone 502. Briefly, the method 900 includes processing a two-dimensional (2-D) code that is used to link respective user accounts on the first and second network application platforms by way of at least one client device.

To that end, as represented by block 9-1, the method 900 includes logging onto a first network application platform using a first set of user credentials. In some implementations, user credentials include a user account identifier (i.e., a username) and a password. For example, with reference to FIG. 5, a user logs onto an account on the first network application platform 540 using the smartphone 502, so that user data on the first network application platform 540 can be accessed via the smartphone 502. However, using conventional methods, unless the user has provided the same account credentials to log in using the laptop 503, the user cannot access the same user data on the first network application platform 540 using the laptop 503.

As provided herein, instead of providing the user credentials again using the laptop 503, the laptop 503 can be used to access the same user data on the first network application platform 540 using the second network application platform 550. As such, as represented by block 9-2, the method 900 includes scanning a two-dimensional (2-D) code displayed by the laptop 503 using the smartphone 502 and/or the laptop 503. In some implementations, as represented by sub-block 9-2a, the method 900 includes performing a screen capture from the integrated device displaying the 2-D code. For example, with reference to FIG. 5, in some implementations, when the laptop 503 is displaying the 2-D code, the laptop 503 is operated to perform a screen capture by, for example, copying the display buffer can creating a image file with the copied data. In some implementations, as represented by sub-block 9-2b, the method includes scanning the 2-D code from the display of a second device. For example, in some implementations, when the laptop 503 is displaying the 2-D code. The smartphone 502 is used to capture a picture of the laptop display by, for example, taking a picture using a camera included in the smartphone 5-2.

In some implementations, as represented by block 9-3, the method 900 includes processing the scanned image of the 2-D code. More specifically, as represented by block 9-3a, the method includes deciphering information from the 2-D code. For example, when the 2-D code is a bar code, the 2-D code is decoded the information included in the bar code.

In some implementations, as represented by block 9-4, the method 900 includes transmitting at least a portion of the information conveyed by the 2-D code to the first network application platform. In some implementations, as represented by sub-block 9-4a, the method 900 includes transmitting a scanned copy of the 2-D to the first network application platform. In some implementations, as represented by sub-block 9-4b, the method 900 includes transmitting a sub-set of the information deciphered from the 2-D code.

It should be noted that, the sequence numbers of the foregoing embodiments of the present invention are merely for description and do not represent the superiority or inferiority of the embodiments.

Persons of ordinary skill in the art may understand that all or a part of the steps of the foregoing embodiments may be implemented through hardware, or may also be completed by a program instructing relevant hardware. The program may be stored in a computer readable storage medium. The storage medium may be a read-only memory, a magnetic disk, an optical disk, or the like.

The foregoing descriptions are merely exemplary embodiments of the present invention, but are not intended to limit the present invention. Any modification, equivalent replacement, or improvement made within the spirit and principle of the present invention shall fall within the protection scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of a first network application platform providing a second network application platform access to user data hosted on the first network application platform, the method comprising:
    at the first network application platform comprising at least one processor and non-transitory memory:
        receiving, from a second client device, a request to allow access to the user data hosted on the first network application platform;
        generating a two-dimensional code to enable access to the user data through the second network application platform;
        transmitting the two-dimensional code to the second network application platform, wherein the second network application platform is configured to send the two-dimensional code to the second client device for display;
        receiving information associated with the two-dimensional code from a first client device, wherein the first client device is configured to capture the two-dimensional code displayed on the second client device, further including:
            obtaining an identifier of the first client device;
            searching for user information based at least on the identifier;
            establishing and storing a corresponding relationship between the second network application platform and the user information;
            sending authorization determination information to the first client device directing the first client device to determine whether to perform authorization; and
        authorizing access to the user data from the second client device through the second network application platform based at least on the received information associated with the two-dimensional code, further including:
            receiving an authorization confirmation instruction from the first client device; and
            sending authorization confirmation information to the second network application platform.

2. The method of claim 1, wherein the request is included in a message addressed from the first client device, wherein the second client device has access to the second network application platform.

3. The method of claim 2, wherein the two-dimensional code is transmitted with instructions directing the second network application platform to provide the two-dimensional code to the second client device.

4. The method of claim 3, wherein providing the two-dimensional code to the second client device includes providing an instruction directing the second client device to visually display the two-dimensional code.

5. The method of claim 3, wherein providing the two-dimensional code to the second client device includes presenting the two-dimensional code on a security enhanced web-page that is displayable by the second client device.

6. The method of claim 2, wherein the two-dimensional code is transmitted with instructions directing the second network application platform to provide the two-dimensional code to the second client device.

7. The method of claim 1, wherein the received information associated with the two-dimensional code includes at least one of a scanned image of the two-dimensional code and information decoded from the two-dimensional code by the first client device.

8. The method of claim 1, wherein authorizing access to the user data through the second network application platform includes comparing the received information associated with the two-dimensional code to locally stored information associated with the two-dimensional code.

9. The method of claim 8, wherein generating the two-dimensional code includes encoding at least a portion of the locally stored information associated with the two-dimensional code.

10. The method of claim 1, wherein generating the two-dimensional code comprises generating a universal unique identifier (UUID) corresponding to the second network application platform.

11. The method of claim 10, wherein transmitting the two-dimensional code to the second network application platform comprises sending the UUID to the second network application platform along with instructions directing the second network application platform to provide the UUID to one or more client devices.

12. The method of claim 11, wherein the instructions directing the second network application platform also includes instruction for the second network application platform to provide a authorization request web-page.

13. The method of claim 10, wherein receiving information associated with the two-dimensional code includes receiving information associated with the UUID.

14. The method of claim 13, wherein the information associated with the UUID includes at least one of a scanned copy of the UUID and information decoded from the UUID.

15. The method of claim 1, further comprising receiving a non-authorization confirmation instruction from the first client device, and sending non-authorization confirmation information to the second network application platform.

16. A first network application platform server system comprising:
a processor;
a network interface; and
a non-transitory memory including instructions, that when executed by the processor cause the server system to:
receive, using the network interface, a request from a second client device to allow access to the user data hosted on the first network application platform;
generate a two-dimensional code to enable access to the user data through a second network application platform;
transmit, using the network interface, the two-dimensional code to the second network application platform, wherein the second network application platform is configured to send the two-dimensional code to the second client device for display;
receive, using the network interface, information associated with the two-dimensional code from a first client device, wherein the first client device is configured to capture the two-dimensional code displayed on the second client device, further including:
obtain an identifier of the first client device;
search for user information based at least on the identifier;
establish and store a corresponding relationship between the second network application platform and the user information; and
send authorization determination information to the first client device directing the first client device to determine whether to perform authorization; and
authorize access to the user data from the second client device through the second network application platform based at least on the received information associated with the two-dimensional code, further including:
receive an authorization confirmation instruction from the first client device; and
send authorization confirmation information to the second network application platform.

17. A method of accessing user data hosted on a first network application platform through a second network application platform, the method comprising:
at a first client device comprising at least one processor and non-transitory memory:
scanning a two-dimensional code displayed on a second client device, wherein the second client device is configured to receive the two-dimensional code from the second network application platform and the two-dimensional code originates from the first network application platform and is transmitted to the second network application platform to enable access to the user data hosted on the first network application platform through the second network application platform; and
transmitting at least a portion of information associated with the two-dimensional code to the first network application platform, wherein the first network application platform is configured to:
obtain an identifier of the first client device;
search for user information based at least on the identifier;
establish and store a corresponding relationship between the second network application platform and the user information; and
send authorization determination information to the first client device directing the first client device to determine whether to perform authorization; and
sending an authorization confirmation instruction to the first network application platform, wherein the first network application platform is configured to send authorization confirmation information to the second network application platform.

18. The method of claim 17, further comprising receiving an access indicator in response to transmitting at least the portion of the information associated with the two-dimensional code to the first network application platform, wherein the access indicator is representative of whether or not access has been granted for the second client device to the user data hosted on the first network application platform through the second network application platform.

19. The method of claim 18, further comprising directing access to the user data hosted on the first network application platform through the second network application platform application running on the second client device.

* * * * *